(12) United States Patent
Garcia-Dieguez et al.

(10) Patent No.: US 12,533,662 B2
(45) Date of Patent: Jan. 27, 2026

(54) CATALYSTS CONTAINING COPPER, ZINC OXIDE, ALUMINA AND SILICA

(71) Applicant: JOHNSON MATTHEY PUBLIC LIMITED COMPANY, London (GB)

(72) Inventors: Monica Garcia-Dieguez, Billingham (GB); Pauline Elizabeth Glen, Billingham (GB); Norman Macleod, Billingham (GB); Neetisha Mistry, Billingham (GB); Michael Thomas Nicholson, Billingham (GB); Simone Roloff-Standring, Billingham (GB); Melanie Andrea Stanway, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 1010 days.

(21) Appl. No.: 17/310,926

(22) PCT Filed: Mar. 16, 2020

(86) PCT No.: PCT/GB2020/050669
§ 371 (c)(1),
(2) Date: Aug. 31, 2021

(87) PCT Pub. No.: WO2020/212681
PCT Pub. Date: Oct. 22, 2020

(65) Prior Publication Data
US 2022/0152597 A1 May 19, 2022

(30) Foreign Application Priority Data

Apr. 15, 2019 (GB) ..................... 1905293

(51) Int. Cl.
| | | |
|---|---|---|
| *B01J 23/80* | (2006.01) | |
| *B01J 21/12* | (2006.01) | |
| *B01J 35/30* | (2024.01) | |
| *B01J 35/40* | (2024.01) | |
| *B01J 35/55* | (2024.01) | |
| *B01J 35/61* | (2024.01) | |
| *B01J 37/00* | (2006.01) | |
| *B01J 37/02* | (2006.01) | |
| *B01J 37/03* | (2006.01) | |
| *B01J 37/04* | (2006.01) | |
| *B01J 37/06* | (2006.01) | |
| *B01J 37/08* | (2006.01) | |
| *C01B 3/16* | (2006.01) | |
| *C07C 29/154* | (2006.01) | |
| *B01J 35/23* | (2024.01) | |

(52) U.S. Cl.
CPC ............... *B01J 23/80* (2013.01); *B01J 21/12* (2013.01); *B01J 35/392* (2024.01); *B01J 35/40* (2024.01); *B01J 35/55* (2024.01); *B01J 35/615* (2024.01); *B01J 37/0009* (2013.01); *B01J 37/0236* (2013.01); *B01J 37/035* (2013.01); *B01J 37/04* (2013.01); *B01J 37/06* (2013.01); *B01J 37/088* (2013.01); *C01B 3/16* (2013.01); *C07C 29/154* (2013.01); *B01J 35/23* (2024.01); *B01J 2235/00* (2024.01); *C01B 2203/0283* (2013.01); *C01B 2203/1076* (2013.01); *C01B 2203/1082* (2013.01)

(58) Field of Classification Search
None
See application file for complete search history.

(56) References Cited

U.S. PATENT DOCUMENTS

| | | | |
|---|---|---|---|
| 4,535,071 | A | 8/1985 | Schneider et al. |
| 4,788,175 | A | 11/1988 | Short et al. |
| 4,863,894 | A | 9/1989 | Chinchen et al. |
| 5,663,445 | A | 9/1997 | Horn et al. |
| 6,048,820 | A | 4/2000 | Takeuchi et al. |
| 8,183,173 | B2 | 5/2012 | Mcdaniel et al. |
| 9,314,774 | B2 | 4/2016 | Goto et al. |
| 2009/0048355 | A1 | 2/2009 | Polier et al. |
| 2009/0149324 | A1 | 6/2009 | Madon et al. |
| 2012/0202681 | A1 | 8/2012 | Park et al. |
| 2015/0111975 | A1 | 4/2015 | Goto et al. |

FOREIGN PATENT DOCUMENTS

| | | |
|---|---|---|
| CL | 2008003747 A1 | 12/2010 |
| CN | 101306369 A | 11/2008 |
| CN | 101322940 A | 12/2008 |
| CN | 102458650 A | 5/2012 |
| CN | 104379255 A | 2/2015 |
| CN | 105833876 B | 3/2019 |

(Continued)

OTHER PUBLICATIONS

Figueiredo et al., Influence of the preparation methods and redox properties of Cu/ZnO/Al2O3 catalysts for the water gas shift reaction, Journal of Molecular Catalysis A: Chemical 318, 2010 (Figueiredo) (Year: 2010).*

*Primary Examiner* — Keling Zhang
(74) *Attorney, Agent, or Firm* — BakerHostetler

(57) ABSTRACT

A catalyst suitable for use in carbon oxide conversion reactions is provided. The catalyst is in the form of a shaped unit formed from an oxidic catalyst powder and contains 30-70% by weight of copper oxide, zinc oxide, alumina and silica. The catalyst has a Si:Al atomic ratio in the range 0.005:1 to 0.15:1, a BET surface area >105 m$^2$/g and a copper surface area >37 m$^2$/g catalyst. The catalyst is prepared by a co-precipitation method using an alumina sol.

13 Claims, No Drawings

(56) References Cited

FOREIGN PATENT DOCUMENTS

| EP | 0202824 A2 | 11/1986 |
|----|------------|---------|
| JP | 2000126597 A | 5/2000 |
| WO | 03089125 A2 | 10/2003 |
| WO | 2008/047166 A2 | 4/2008 |
| WO | 2010/029325 A1 | 3/2010 |
| WO | 2010146379 A1 | 12/2010 |
| WO | 2013/183577 A1 | 12/2013 |
| WO | 2016059431 A1 | 4/2016 |

* cited by examiner

CATALYSTS CONTAINING COPPER, ZINC OXIDE, ALUMINA AND SILICA

This invention relates to copper-containing catalysts, their manufacture and use in carbon oxide conversion reactions, such as the water-gas shift reaction and methanol synthesis.

Carbon oxide conversion processes are of considerable importance in the manipulation of synthesis gas by the water-gas shift reaction and the production of alcohols such as methanol. These reactions are depicted below.

$$CO+H_2O \rightarrow CO_2+H_2$$

$$CO+2H_2 \rightarrow CH_3OH$$

$$CO_2+3H_2 \rightarrow CH_3OH+H_2O$$

The catalysts may also be used in the reverse water-gas shift reaction and in the steam reforming of methanol to produce hydrogen and carbon oxides.

The catalysts for such reactions are generally produced by forming into pellets small discrete particles of an intimate mixture of copper oxide and one or more oxidic materials, generally including zinc oxide, that are not substantially reduced under the conversion reaction process conditions. The intimate mixture is generally made by precipitation of copper compounds and compounds convertible to the other oxidic materials, and/or precipitation of the copper compounds in the presence of the other oxidic materials or compounds convertible thereto, followed by calcination to convert the precipitated copper compounds, and other components as necessary, to the oxides. Hence pellets are formed from oxidic powders. In order to generate the active catalyst, the pellets are subjected to reducing conditions to reduce the copper oxide in said pellets to metallic copper. The reduction step is normally carried out in the reactor where the carbon oxide conversion process is to be effected: thus normally a catalyst precursor in which the copper is present in the form of copper oxide is charged to the reactor and the reduction effected by passing a suitable reducing gas mixture therethrough.

Activity of the catalysts is generally related to the metallic copper surface area, with higher surface areas providing higher initial activity. However, catalyst selectivity and longevity in use are affected by the heat, reactants and the by-products in the reactions.

U.S. Pat. No. 6,048,820 discloses a copper-based catalyst comprising copper oxide, zinc oxide, aluminium oxide, and silicon oxide and optionally containing zirconium oxide, gallium oxide, and palladium oxide, wherein with the total weight of the catalyst being taken as 100%, the above oxides account for, in the order mentioned, 20-60 weight %, 10-50 weight %, 2-10 weight %, 0.3-0.9 weight %, 0-40 weight %, 0-10 weight %, and 0-10 weight %, respectively, and the silicon oxide has been derived from colloidal silica or dissolved silica in water. The catalysts were prepared by co-precipitation of soluble copper, zinc and aluminium compounds and were subjected to calcination at 480-690° C. The initial catalytic activity of these catalysts is, however, relatively low.

CN101306369 discloses a methanol synthesis catalyst comprising the oxides of Cu, Zn, Al and Si, wherein a silica-modified alumina is adopted as a carrier, Cu and Zn are active constituents, and the molar ratio of the component elements is as follows: Cu:Zn:Al:Si is equal to (5-6):(2-3):(0.8-1):(0.0016-0.05). The method used for preparing the catalyst is divided into three steps: firstly, a coprecipitation method is used to form a co-precipitate of Al and Si compounds; secondly, the coprecipitation method is used to form a co-precipitate of Cu and Zn compounds; finally, the two obtained co-precipitates are mixed according to a certain proportion and aged, then filtered, washed, dried and calcined. We have found catalysts prepared by this route to have relatively poor stability.

U.S. Pat. No. 9,314,774 discloses a methanol synthesis catalyst comprising copper, zinc, aluminum and silicon, having a molar ratio of zinc to copper of 0.5 to 0.7, a molar ratio of silicon to copper of 0.015 to 0.05, a maximum intensity ratio of a peak derived from zinc to a peak derived from copper of not more than 0.25 and a half-value width (2θ) of the peak derived from copper of 0.75 to 2.5. The catalyst is produced by calcination of a precursor comprising copper, zinc, aluminum and silicon, and having (A) a molar ratio of zinc to copper being 0.5 to 0.7, and (B) a molar ratio of silicon to copper being 0.015 to 0.05, at a temperature of 300° C. to 450° C. We have found such catalysts to have relatively poor initial activity.

We have found a combination of alumina and silica, wherein the alumina is derived from an alumina sol, in copper-containing catalyst compositions, provides a surprisingly high initial activity combined with an improved resistance to deactivation compared to silica-free catalysts or silica-containing catalysts where the alumina is derived from soluble aluminium salts.

Accordingly the invention provides a catalyst suitable for use in carbon oxide conversion reactions in the form of a shaped unit formed from an oxidic catalyst powder, said catalyst comprising 30 to 70% by weight of copper oxide, combined with zinc oxide, alumina and silica, having a Si:Al atomic ratio in the range of 0.005 to 0.15:1, and having a BET surface area ≥105 m²/g and a copper surface area >37 m²/g catalyst.

The invention further provides a method for making the catalyst comprising the steps of:
(i) forming, in an aqueous medium, an intimate mixture comprising a co-precipitate of copper and zinc compounds, with alumina and silica wherein the alumina is provided by an alumina sol,
(ii) recovering, washing and drying the intimate mixture to form a dried composition, and
(iii) calcining and shaping the dried composition to form the catalyst.

The invention further comprises a carbon oxides conversion process using the catalyst.

The copper oxide content of the catalyst (expressed as CuO) is in the range of 30 to 70% by weight. Within this range a copper oxide content in the range of 50 to 70% by weight, preferably 60 to 70% by weight, is of general application for methanol synthesis, whereas for the water-gas shift reaction, the copper oxide content is generally lower, particularly in the range of 30 to 60% by weight.

Unless otherwise stated, the weight percentages of the metal oxides in the catalyst are determined on a loss-free basis. The metal oxide contents in the catalyst are suitably determined on a loss-free basis, to remove variability in the catalysts caused by differences in the amount of residual carbonate compounds and moisture on the catalyst. A particularly suitable method for determining the metal oxide content on a loss-free basis is to heat the catalyst to 900° C. for 2 hours in air to remove volatiles before measuring the metal oxide contents. The heat-treated catalyst may be stored under anhydrous conditions. The metal oxide content of the catalysts may be determined using any suitable elemental analysis technique, such as X-ray fluorescence spectroscopy (XRF) using known techniques.

A preferred catalyst precursor composition, prior to calcination to the oxidic catalyst, comprises a solid containing mixed metal carbonates, including hydroxycarbonates, of Cu and Zn, with alumina or hydrated alumina, silica or hydrous silica dispersed therein. The weight ratio of Cu:Zn (expressed as CuO:ZnO) may be 1:1 or higher but is preferably in the range of 2:1 to 3.5:1, especially 2.5:1 to 2.75:1 for methanol synthesis catalysts and in the range of 1.4:1 to 2.0:1 for water-gas shift catalysts. In the methanol synthesis catalysts, the catalyst preferably contains 20-30% by weight zinc oxide.

The catalyst contains alumina, which may be in an amount in the range 5 to 20% by weight preferably 5 to 15% by weight, more preferably 8 to 11% by weight. The alumina in the catalyst is derived from an alumina sol and may be present principally as a boehmite AlOOH, and/or as a transition alumina such as gamma alumina. The alumina in the catalyst is not present as a crystalline aluminosilicate. The Applicant has found alumina sol-based catalysts to have higher BET and copper surface areas after calcination and shaping, and so provide an enhanced initial activity over catalysts prepared using soluble aluminium compounds.

The catalyst has a copper surface area >37 $m^2/g$ catalyst, preferably ≥40 $m^2/g$ catalyst, more preferably ≥45 $m^2/g$ catalyst and most preferably ≥50 $m^2/g$ catalyst. Copper surface areas up to about 60 $m^2/g$ catalyst may be achieved. These surface areas are suitably determined on the catalyst as received. The copper surface area may be readily established by using reactive frontal chromatography as described in EP-A-0202824. A particularly suitable method is as follows: catalyst shaped units are crushed and sieved to a particle size of 0.6 to 1.00 mm. About 2.0 g of the crushed material is weighed into a glass tube and heated to 68° C. and purged with helium for 2 minutes. Then, the catalyst is reduced by heating it in a flow of 5% vol $H_2$ in helium, at 4° C./min up to 230° C. and holding at this temperature for 30 minutes until fully reduced. The reduced catalyst is cooled to 68° C. under helium. The reduced catalyst then has a 2.5 vol $N_2O$ in helium gas mixture passed over the catalyst. The evolved gases are passed through a gas chromatograph and the $N_2$ evolution is measured. From this, the copper surface area per gram of un-reduced catalyst may be calculated.

The properties of the calcined catalyst, especially where the catalyst is for methanol synthesis, may be further enhanced by the addition of one or more promoter compounds selected from compounds of Mg, Co, Mn, V, Ti, Zr or rare earths. Magnesium compounds are preferred, and the catalyst may contain magnesium oxide in an amount in the range of 1 to 5% by weight. Accordingly, the catalyst may suitably consist essentially of oxides of copper, zinc, aluminium, magnesium and silicon.

Silica is provided in the catalyst at a Si:Al atomic ratio in the range of 0.005 to 0.15:1. The amount of silica in the catalyst is therefore relatively low, and may be in the range of 0.05 to 1.50% by weight, preferably 0.2 to 1.20% by weight, more preferably 0.3 to 0.8% by weight. Higher amounts of silica dilute the active component of the catalyst and may generate acidic sites on the catalyst that reduce selectivity in methanol production. The amount of silica in the catalyst appears to be optimal when the Si:Al atomic ratio is in the range of 0.03 to 0.07:1. The Si:Cu atomic ratio in the catalyst may be in the range of 0.001 to 0.018:1 or 0.004 to 0.017:1 but is preferably in the range 0.007 to 0.009:1. The silica in the catalyst may be derived either from a silica sol, including a silica-modified alumina sol, and/or from a water-soluble silicon compound, such as an alkali metal silicate, e.g. potassium silicate. Organo-silicates, including alkyl-silicates such as tetramethyl-orthosilicate and tetraethyl-orthosilicate may also be used. The silica stabilises the copper during use and thereby improves the long-term activity of the catalyst compared to catalysts without silica.

The BET surface area of the shaped catalyst, as determined by nitrogen physisorption, is ≥105 $m^2/g$, and is preferably ≥107 $m^2/g$, more preferably ≥109 $m^2/g$, most preferably ≥110 $m^2/g$, and especially 115 $m^2/g$. BET surface areas up to about 140 $m^2/g$ may be achieved. The BET surface areas are suitably determined on a crushed pellet. The BET surface areas on un-shaped powders are higher, and may be in the range 120 to 160 $m^2/g$. Such very high BET surface areas are believed to arise in part as a consequence of the alumina-sol-based preparation method and provide a stable support for highly dispersed copper.

In the catalyst, the zinc oxide, alumina, silica, and promoter oxide if present, are not substantially reduced to metal under the carbon oxide conversion process conditions and are typically present as the oxides in the catalyst. The copper oxide may be reduced either ex-situ or in-situ to form catalytically active copper metal crystallites before use.

The oxidic copper-containing catalyst is prepared by a method comprising the step of forming, in an aqueous medium, an intimate mixture comprising a co-precipitate of copper and zinc compounds, with alumina and silica wherein the alumina is provided by an alumina sol. The co-precipitate may be prepared by mixing an acidic aqueous solution containing copper and zinc compounds in the appropriate ratio and combining this with an aqueous alkaline precipitant solution. The copper and zinc compounds are preferably nitrates. Compounds of promoters, such as nitrates of Mg or Zr, may be included in the acidic solution of copper and zinc compounds. The alkaline precipitant may be an alkali-metal carbonate, an alkali metal hydroxide or a mixture thereof. The alkaline precipitant preferably comprises an alkali metal carbonate. Potassium or sodium precipitants may be used but a potassium precipitant is preferred as we have found it to be more readily removed by washing than sodium from the precipitated composition. The reaction of the alkaline precipitant with the copper and zinc compounds in the acidic solution causes the precipitation of a mixed copper-zinc co-precipitate. The precipitation may be performed at temperatures in the range of 10 to 80° C., but is preferably performed at elevated temperature, i.e. in the range 40 to 80° C., more preferably 50 to 80° C., especially 60 to 80° C., as this has been found to produce small crystallites that, after calcination, provide higher copper surface areas.

The acidic and alkaline solutions may be added one to another in a precipitation vessel but are preferably added simultaneously to the precipitation vessel such that the pH in the precipitation vessel is maintained between 6 and 9, preferably between 6 and 7 after which the resulting co-precipitate slurry is aged, preferably in a separate ageing vessel, at a temperature in the range of 10 to 80° C., preferably in the range of 40 to 80° C., more preferably 50 to 80° C., especially 60 to 80° C., to form crystalline compounds, preferably crystalline hydroxycarbonate compounds, of copper and zinc. Ageing of the co-precipitate slurry may be carried out in a batch or semi-continuous procedure whereby the aqueous slurry of the precipitated material is held in one or more stirred vessels for selected periods of time. Suspension of the co-precipitate in the liquid can be by mere stirring, the vigour of stirring depending on the tendency of the particles to settle and the viscosity. Alternatively, the co-precipitate slurry may be aged in a pulse-flow reactor as described in WO2008/047166, which is herein incorporated by reference. The reaction and after-treatment conditions of the co-precipitate slurry can be chosen to produce crystalline compounds, for example of the Manasseite, Rosasite, Aurichalcite or Malachite type. The co-precipitation and ageing are preferably operated to produce malachite [$Cu_2(CO_3)(OH)_2$], smithsonite [$ZnCO_3$] and/or zincian malachite [$(Cu/Zn)_2(CO_3)(OH)_2$] phases, which may be determined by XRD.

The catalyst is prepared using an alumina sol. An alumina sol is an aqueous colloidal dispersion of aluminium hydroxide, including boehmite and pseudo boehmite. The pH of the dispersion may suitably be <7, preferably in the range 3 to 4. The alumina sol may suitably be added to the precipitation vessel. Preferably, the alumina sol is added to the precipitation vessel separately from the acidic metal solution or alkaline precipitant solution as this has been found to enhance the properties of the catalyst. Alumina sols are available commercially or may be prepared by known methods. The alumina concentration in the sol may be 30 to 200 g/litre. Particularly suitable alumina sols comprise dispersions of colloidally dispersed boehmite having a D50 average particle size in the range of 5 to 200 nm, preferably 5 to 100 nm, more preferably 5-50 nm, when dispersed. Such sols are commercially available.

The catalyst contains silica. If a silica sol is used as the source of silica, it may be added to the acidic metal solution and/or added to the precipitation vessel and/or the ageing vessel and/or the alumina sol. Particularly suitable silica sols comprise aqueous dispersions of colloidally dispersed silica having a particle size in the range of 10-20 nm. The pH of the dispersion may be <7, preferably in the range 2 to 4. The silica concentration in the sol may be 100-400 g/litre. Such sols are available commercially as, for example, Nissan Chemicals Snowtex-O and Grace Ludox HSA. Alternatively, the silica may be added as a silica-modified alumina sol. Particularly suitable silica-modified alumina sols comprise dispersions of colloidally dispersed silica-modified boehmite. Such sols are available commercially, for example, as Sasol Siral 5D.

If a water-soluble silicate, such as an alkali metal silicate, is used as the source of silica, it may be added to the alkaline precipitant solution and/or to the alumina sol and/or to the precipitation vessel and/or the ageing vessel. Suitable alkali metal silicates are soluble sodium silicates and soluble potassium silicates. Such alkali silicates are commercially available, for example, as PQ Corporation Kasil 1, PQ Corporation Kasolv 16 or Zaclon LLC Zacsil 18. Where an alkali metal silicate is used as the source of silica in the catalyst, the alkali metal in the alkali metal silicate preferably matches the alkali metal in the precipitant solution as this improves washing, recovery of catalyst and re-processing of waste solutions at scale. The amount of silicon, expressed as $SiO_2$, in the alkali metal silicate solution may be in the range 15-30 wt %.

If an organo-silicate, such as an alkyl-silicate of formula $Si(OR)_4$, where R=C1-C4 alkyl, is used as the source of silica, because it will hydrolyse when contacted with water, it is preferably added to the alumina sol or to the precipitation and/or ageing vessels.

After co-precipitation and ageing, the intimate mixture is recovered, e.g. by separation of the mother liquors using known methods such as filtering, decanting or centrifuging, and is washed to remove residual soluble salts.

Washing of the intimate mixture may be performed using conventional equipment such as plate-and-frame filter presses, for example by re-slurrying the mixture one or more times in salt-free water, or by dynamic cross-flow filtration using an Artisan thickener or Shriver thickener before recovery. For methanol synthesis catalysts, the alkali metal content of the recovered and dried mixture should desirably be reduced to below 0.2% wt, preferably below 0.1% wt, calculated as the respective alkali metal oxide on the dried material on a loss-free basis, because alkali metal is detrimental to the performance of the catalyst.

The recovered intimate mixture is dried to form a dried composition. The drying may comprise heating the damp mixture in discrete stages or continuously over an extended period until the maximum temperature is reached. The drying step may be performed at temperatures in the range of 90 to 150° C., preferably 90 to 130° C. under air or an inert gas using conventional drying equipment such as in an oven, rotary drier, spray drier or similar equipment.

The dried composition is typically in the form of a powder. The average particle size (as determined by sieve fractions, i.e. the weight-average particle size) may be in the range of 10-300 μm (microns). The dried composition may comprise one or more hydroxycarbonates of copper and zinc, as well as alumina and silica.

The dried composition is calcined and shaped to form the catalyst. The dried composition may be calcined, i.e. heated, to convert the copper and zinc compounds, and any promoter compounds, to their respective oxides prior to shaping or, less preferably, the dried composition may be formed into shaped units before calcination. This latter method is less preferred because the calcination of shaped units generally reduces their strength and makes it more difficult to control pellet density. In the present invention, the calcination may be performed at temperatures in the range of 275 to 450° C. preferably 275 to 400° C., more preferably 275 to 350° C. Lower temperatures provide lower pellet stabilities, whereas higher temperatures significantly reduce the initial activity created by the high copper dispersion. Calcination may be performed under air or an inert gas such as nitrogen, but air or another free-oxygen-containing gas is preferred. The calcined product is typically in the form of a powder.

The shaped units are preferably pellets. The dried or calcined powder may therefore be subjected to pelleting, optionally after pre-compacting the powder, which can improve the pelleting process. The pellet may suitably be a cylindrical pellet. Cylindrical pellets for carbon oxide conversion processes suitably have a diameter in the range of 2.5 to 10 mm, preferably 3-10 mm and an aspect ratio (i.e. length/diameter) in the range of 0.5 to 2.0. Alternatively, the shaped unit may be in the form of rings. In a particularly suitable embodiment, the shaped unit is in the form of a cylinder having two or more, preferably 3 to 7 grooves running along its length. Suitable domed cylindrical shapes having one or more flutes are described in our WO 2010/029325, herein incorporated by reference.

Pellets, particularly cylindrical pellets with flat or domed ends as described above, are desirably made with pellet densities in the range of 1.8 to 2.4 $g/cm^3$, preferably 1.9 to 2.3 $g/cm^3$. The pellet density may readily be determined by calculating the volume from the pellet dimensions and measuring its weight. As the density is increased, the interstitial volume in the shaped units is reduced, which in turn reduces the permeability of reacting gases. Therefore, for densities >2.4 $g/cm^3$ the reactivity of the catalyst may be less than optimal, despite the high volumetric copper content. For densities <1.8 $g/cm^3$ the crush strengths may be insufficient for long-term use in modern carbon-oxide conversion processes.

The invention further includes a carbon oxides conversion process, which comprises reacting a carbon oxide containing process gas containing at least one of carbon monoxide and carbon dioxide and additionally containing hydrogen and/or steam, in the presence of the catalyst. Accordingly, the term "carbon oxides" herein includes at least one of carbon monoxide and carbon dioxide. The catalyst may be pre-activated in-situ by exposing it to a reducing gas stream, preferably comprising hydrogen, to convert the copper oxide into elemental copper. Thus, the invention preferably includes the steps of (i) activating the catalyst by contacting it with a reducing gas stream and (ii) reacting a carbon oxide containing process gas containing at least one of carbon monoxide and carbon dioxide and additionally containing hydrogen and/or steam, in the presence of a catalyst to form a product stream. Activation may be performed using a hydrogen containing gas, including synthesis gas comprising hydrogen and carbon oxides, at temperatures above 80° C. and at pressures in the range of 1-50 bar g. The maximum reduction temperature is desirably 150 to 300° C.

The invention includes processes using the catalyst, in particular:

A. Methanol synthesis in which a gas mixture containing one or both carbon oxides (i.e. carbon monoxide and/or carbon dioxide) and hydrogen is passed over the catalyst at a temperature in the range of 200-320° C., a pressure in the range of 20-250, especially 30-120, bar abs and a space velocity in the range of 500-20000 $h^{-1}$. The process can be on a once-through or a recycle basis, and can involve cooling by indirect heat exchange with surfaces in contact with the reacting gas, or by subdividing the catalyst bed and cooling the gas between the beds by injection of cooler gas. For this process, the catalyst preferably contains copper, zinc oxide and optionally magnesia, with alumina and silica. The catalysts may be used in methanol synthesis processes in which natural gas is steam reformed and/or autothermally reformed with oxygen to produce a synthesis gas containing carbon monoxide, carbon dioxide and hydrogen, or in processes where the synthesis gas is richer in carbon monoxide and is derived by the gasification of coal or biomass or municipal waste. The catalyst may be of particular use in methanol synthesis processes where a synthesis gas is formed essentially from hydrogen and carbon dioxide, especially where the hydrogen and/or carbon dioxide are recovered only from renewable sources, such as from the electrolysis of water for hydrogen and $CO_2$-recovery from waste gases, such as combustion gas or landfill gas.

B. Modified methanol synthesis in which the catalyst contains also free alumina of surface area 50-300 $m^2\ g^{-1}$, or another acidic catalyst, so that the synthesis product is relatively rich in dimethyl ether. Temperatures, pressures and space velocities are similar to those for methanol synthesis but the synthesis gas may contain hydrogen and carbon monoxide in a molar ratio of less than 2.

C. Low temperature shift reaction in which a gas containing carbon monoxide (preferably under 4% v/v on a dry basis) and steam (in which the steam to total dry gas molar ratio is typically in the range of 0.3 to 1.5) is passed over the catalyst in an adiabatic fixed bed at an outlet temperature in the range of 200 to 300° C. at a pressure in the range of 15-50 bar abs. Usually the inlet gas is the product of "high temperature shift" in which the carbon monoxide content has been decreased by reaction over a high temperature shift catalyst, such as an iron catalyst or zinc aluminate catalyst, at an outlet temperature in the range of 400 to 500° C., followed by cooling by indirect heat exchange. The outlet carbon monoxide content from the low temperature shift step is typically in the range of 0.1 to 1.0%, especially under 0.5% v/v on a dry basis.

D. Medium temperature shift in which the gas containing carbon monoxide and steam is fed at a pressure in the range of 15-50 bar abs to the catalyst at an inlet temperature typically in the range of 200 to 240° C. although the inlet temperature may be as high as 280° C., and the outlet temperature is typically up to 300° C. but may be as high as 360° C. These conditions are more severe than in B, such that the new catalyst is expected to be especially advantageous.

E. Low-medium temperature shift with heat exchange, in which the reaction in the catalyst bed occurs in contact with heat exchange surfaces. The coolant conveniently is water under such a pressure such that partial, or complete, boiling takes place. A suitable pressure is 15 to 50 bar abs and the resulting steam can be used, for example, to drive a turbine or to provide process steam for shift, or for an upstream stage in which the shift feed gas is generated. The water can be in tubes surrounded by catalyst or vice versa.

F. Methanol reforming in which a gaseous methanol stream is combined with steam and/or carbon dioxide and subjected to reaction, typically at temperatures in the range of 250 to 360° C. and at pressures typically in the range of 10 to 30 bar abs, over the catalyst to generate a gas mixture containing hydrogen and carbon oxides. The hydrogen may be recovered from the gas mixture using conventional separation methods such as pressure-swing adsorption or hydrogen-permeable membranes.

The present invention is particularly suitable for methanol synthesis catalysts.

The invention is now further described by reference to the following Examples.

In the Examples, unless otherwise stated, the catalysts were prepared at a 4-7 litre scale by simultaneous addition of a mixed metal nitrate solution, an alkali metal precipitant solution and an aqueous alumina sol dispersion to a 1 L stirred precipitation vessel held at 65 to 70° C. Ageing of the co-precipitate slurry was performed in a separate stirred vessel for up to 2 hours, again at 65 to 70° C. The silica was added to the catalyst by various means at different points in the preparation process. The aged precipitate slurries were filtered and washed with demineralised water. Drying and calcination of the washed precipitate was, unless otherwise stated, carried out at 110° C. and 300-330° C. respectively. The resulting powders were compacted into a shaped unit, which was subsequently crushed into grit particles suitable for testing.

The sols used were aqueous. The sol properties were as follows:

| Dispersed Phase | Alumina Sol Dispersible Boehmite | Silica-modified Alumina Sol Dispersible Si-Modified Boehmite | Silica Sol Silica |
| --- | --- | --- | --- |
| AlOOH (wt. %) | 82-92 | 76-86 | — |
| $SiO_2$ (wt. %) | — | 3.4-3.8 | 20-21 |
| D50 Dispersed Particle Size (nm) | 5-50 | ≤200 | 10-20 |
| pH of Sol | 3.5-4 | 2-4 | 2-4 |

The copper surface areas were determined on the crushed pellet grit using reactive frontal chromatography as described above on an as-received basis.

Particle size measurements were made using a disc centrifuge.

The metal oxide contents were determined and reported on a loss-free basis by heating a known weight of the as-received catalyst powder in a crucible in a pre-heated oven at 900° C. for 2 hours under air. The crucible was then cooled in a sealed and vented desiccator before being reweighed to determine the weight loss. The heat-treated catalysts were analysed for their metal contents using X-ray fluorescence (WD-XRF) using known methods.

BET surface areas were determined on the crushed pellet grit, after drying, by nitrogen physisorption using a Micromeritics 2420 ASAP physisorption analyser in accordance with ASTM Method D 3663-03; Standard Test for Surface Area. Nitrogen was used as the adsorbate and the measurements carried out at liquid nitrogen temperature (77K). The cross-sectional area of a nitrogen molecule was taken as 16.2 Å$^2$. Samples were outgassed prior to analysis by purging with dry nitrogen gas for a minimum of 1 hour at an optimal temperature. Five relative pressure/volume data pairs were obtained over the relative pressure region of 0.05 to 0.20 $P/P_o$ inclusive. The equilibration time for each point was 10 seconds.

EXAMPLE 1

An oxidic catalyst with the molar ratio Cu:Zn:Al:Mg:Si of 4.4:1.7:1.0:0.2:0.04 and a copper oxide content of 64.4 wt. % was prepared by co-precipitation of a mixed metal nitrate solution comprising nitrates of copper, zinc and magnesium with a potassium carbonate solution, with simultaneous addition of a mixture of an alumina sol and a silica sol to the precipitation vessel, at a pH of 6.3-6.8 and a temperature between 65-70° C. The resulting precipitate was aged for up to 2 hours at 65-70° C., filtered, washed with demineralised water, dried and calcined in air at 330° C. for 6 hours.

EXAMPLE 2

An oxidic catalyst with the molar ratio Cu:Zn:Al:Si of 5.1:1.9:1.0:0.04 and a copper oxide content of 66.1 wt. % was prepared as described in Example 1, without magnesium nitrate, and with calcination in air at 300° C. for 6 hours.

EXAMPLE 3

An oxidic catalyst with the molar ratio Cu:Zn:Al:Mg:Si of 4.5:1.7:1.0:0.2:0.006 and a copper oxide content of 64.5 wt. % was prepared as described in Example 1 with calcination in air at 305° C. for 6 hours.

EXAMPLE 4

An oxidic catalyst with the molar ratio Cu:Zn:Al:Mg:Si of 4.5:1.7:1.0:0.2:0.08 and a copper oxide content of 64.2 wt. % was prepared as described in Example 1 with calcination in air at 305° C. for 6 hours.

EXAMPLE 5

An oxidic catalyst with the molar ratio Cu:Zn:Al:Mg:Si of 6.7:2.5:1.0:0.3:0.11 and a copper oxide content of 66.1 wt. % was prepared as described in Example 1 with calcination in air at 305° C. for 6 hours.

EXAMPLE 6

An oxidic catalyst with the molar ratio Cu:Zn:Al:Mg:Si of 3.3:1.2:1.0:0.1:0.06 and a copper oxide content of 62.2 wt. % was prepared as described in Example 1 with calcination in air at 305° C. for 6 hours.

EXAMPLE 7

An oxidic catalyst with the molar ratio Cu:Zn:Al:Mg:Si of 5.4:2.0:1.0:0.2:0.04 and a copper oxide content of 65.9 wt. % was prepared by co-precipitation of a mixed metal nitrate solution comprising nitrates of copper, zinc and magnesium with a potassium carbonate solution, with simultaneous addition of a silica-doped alumina sol to the precipitation vessel, at a pH of 6.3-6.8 and a temperature between 65-70° C. The resulting precipitate was aged for up to 2 hours at 65-70° C., filtered, washed with demineralised water, dried and calcined in air at 330° C. for 6 hours.

EXAMPLE 8

An oxidic catalyst with the molar ratio Cu:Zn:Al:Si of 4.3:1.7:1.0:0.04 and a copper oxide content of 64.6 wt. % was prepared by co-precipitation of a mixed metal nitrate solution comprising nitrates of copper and zinc and a silica sol, with a potassium carbonate solution, with simultaneous addition of an alumina sol to the precipitation vessel, at a pH of 6.3-6.8 and a temperature between 65-70° C. The resulting precipitate was aged for up to 2 hours at 65-70° C., filtered, washed with demineralised water, dried and calcined in air at 300° C. for 6 hours.

EXAMPLE 9

An oxidic catalyst with the molar ratio Cu:Zn:Al:Si of 4.0:1.5:1.0:0.03 and a copper oxide content of 64.4 wt. % was prepared by co-precipitation of a mixed metal nitrate solution comprising nitrates of copper and zinc with a potassium carbonate solution, with simultaneous addition of an alumina sol to the precipitation vessel, at a pH of 6.3-6.8 and a temperature between 65-70° C. A silica sol was added to the resulting co-precipitate. The resulting mixture was aged for up to 2 hours at 65-70° C., filtered, washed with demineralised water, dried and calcined in air at 300° C. for 6 hours.

EXAMPLE 10

An oxidic catalyst with the molar ratio Cu:Zn:Al:Mg:Si of 4.4:1.7:1.0:0.2:0.04 and a copper oxide content of 63.2 wt. % was prepared by co-precipitation of a mixed metal nitrate solution comprising nitrates of copper, zinc and magnesium with a potassium carbonate solution, with simultaneous addition of an alumina sol containing a soluble potassium silicate to the precipitation vessel, at a pH of 6.3-6.8 and a temperature between 65-70° C. The resulting precipitate was aged for up to 2 hours at 65-70° C., filtered, washed with demineralised water, dried and calcined in air at 305° C. for 6 hours.

EXAMPLE 11

An oxidic catalyst with the molar ratio Cu:Zn:Al:Si of 4.2:1.6:1.0:0.03 and a copper oxide content of 64.4 wt. % was prepared by co-precipitation of a mixed metal nitrate solution comprising nitrates of copper and zinc with a solution comprising potassium carbonate and potassium silicate, with simultaneous addition of an alumina sol to the precipitation vessel, at a pH of 6.3-6.8 and a temperature between 65-70° C. The resulting precipitate was aged for up to 2 hours at 65-70° C., filtered, washed with demineralised water, dried and calcined in air at 300° C. for 6 hours.

EXAMPLE 12

An oxidic catalyst with the molar ratio Cu:Zn:Al:Mg:Si of 4.2:1.2:1.0:0.2:0.04 and a copper oxide content of 67.8 wt. % was prepared by co-precipitation of a mixed metal nitrate solution comprising nitrates of copper, zinc and magnesium with a sodium carbonate solution, with simultaneous addition of an alumina sol and a silica sol to the precipitation vessel, at a pH of 6.3-6.8 and a temperature between 65-70° C. The resulting precipitate was aged for up to 2 hours at 65-70° C., filtered, washed with demineralised water, dried and calcined in air at 300° C. for 6 hours.

COMPARATIVE EXAMPLE 1

An oxidic catalyst with the molar ratio Cu:Zn:Al:Si of 3.8:2.2:1.0:0.04 and a copper oxide content of 56.6 wt. % was prepared following the procedure outlined in U.S. Pat. No. 6,048,820 Example 2. A mixed metal nitrate solution containing nitrates of copper, zinc and aluminium and a silica sol, and a solution of sodium carbonate were added simultaneously to demineralised water in the precipitation vessel at room temperature with stirring. The resulting precipitate was aged at room temperature for 24 hours, filtered, washed with demineralised water, dried and calcined in air at 600° C. for 2 hours.

COMPARATIVE EXAMPLE 2

An oxidic catalyst with the molar ratio Cu:Zn:Al:Si of 3.8:2.2:1.0:0.04 and a copper oxide content of 56.6 wt. % was prepared as described in Comparative Example 1 with calcination at 305° C. for 6 hours.

COMPARATIVE EXAMPLE 3

An oxidic catalyst with the molar ratio Cu:Zn:Al:Si of 3.3:1.5:1.0:0.01 and a copper oxide content of 60.1 wt. % was prepared following the procedure outlined in CN101306369A Example 5. An aluminium nitrate solution was co-precipitated with a solution of sodium carbonate and sodium silicate at a pH of 7.0-7.2 and a temperature of 80° C. to form Precipitate A. This material was not a stable colloidal suspension and sedimented over several hours. Analysis showed the D50 average particle size to be 226 nm. Separately, a solution of copper and zinc nitrate was co-precipitated with a sodium carbonate solution at a pH of 7.0-7.2 and a temperature between 65-70° C. to form Precipitate B. Precipitate A was added to Precipitate B in a 1:7 ratio by volume. The resulting mixture was aged at 70° C. for 2 hours, filtered, washed with demineralised water, dried and calcined in air at 340° C. for 4 hours.

COMPARATIVE EXAMPLE 4

An oxidic catalyst as described in U.S. Pat. No. 4,788,175 with the molar ratio Cu:Zn:Al:Mg of 4.4:1.6:1.0:0.2 and a copper oxide content of 64.2 wt. % was prepared by co-precipitation of a mixed metal nitrate solution comprising nitrates of copper, zinc and magnesium with a solution of potassium carbonate, with simultaneous addition of an alumina sol to the precipitation vessel, at a pH of 6.3-6.8 and a temperature between 65-70° C. The resulting precipitate was aged for up to 2 hours at 65-70° C., filtered, washed with demineralised water, dried and calcined in air at 330° C. for 6 hours.

COMPARATIVE EXAMPLE 5

An oxidic catalyst with the molar ratio Cu:Zn:Al:Si of 6.2:3.4:1.0:0.08 and a copper oxide content of 59.5 wt. % was prepared following the procedure outlined in U.S. Pat. No. 9,314,774 Example 2. A solution of sodium carbonate was added to a mixed metal nitrate solution containing nitrates of copper, zinc and aluminium and a silica sol, at room temperature with stirring. The resulting precipitate was aged at 70° C. for 2 hours, filtered, washed with demineralised water, dried and calcined in air at 350° C. for 2 hours.

COMPARATIVE EXAMPLE 6

An oxidic catalyst with the molar ratio Cu:Zn:Zr:Al:Si of 4.8:3.3:1.6:1.0:0.12 and a copper oxide content of 42.5 wt. % was prepared following the procedure outlined in U.S. Pat. No. 9,314,774 Comparative Example 5. A mixed metal nitrate solution containing nitrates of copper, zinc, aluminium and zirconium and a silica sol, and a solution of sodium carbonate were added simultaneously to demineralised water at room temperature with stirring. The resulting precipitate was aged at 70° C. for 2 hours, filtered, washed with demineralised water, dried and calcined in air at 400° C. for 2 hours.

Microreactor Testing

Each of the catalyst samples were crushed and sieved to a particle size fraction of 0.6-1.0 mm. The experiments used a conventional micro-reactor. The crushed catalyst samples were fully reduced with a gas mixture of 2% v/v hydrogen in nitrogen at 225° C. A process gas mixture with a gas composition of 6% v/v CO, 6% v/v $CO_2$, 9% v/v $N_2$ and 79% v/v $H_2$ was then introduced over the catalyst samples. The reduced catalyst samples were exposed to the process gas mixture at 225° C., 40,000 L/hr/kg, 50 barg at the start of life. After a period, catalyst samples were exposed to deactivating conditions over 300° C. to simulate harsh operating conditions and accelerate the ageing effects. Analysis flow scans of product gases were performed at the start of life and after the catalyst had been held at deactivation conditions. Analysis flow scans were performed by varying the mass velocity at 225° C., 50 barg. An infra-red analyser was used to determine the % v/v concentration of the exit gas streams from the reactors. The analysis flow scan data was used to calculate the relative activity of the test material against a reference catalyst, selected in these experiments to be Comparative Example 1. The relative activities are calculated from the ratio of the flow rates through each catalyst at constant conversion relative to the flow rate through the standard catalyst. The results are set out in the following table:

| Sample | Al Source | BET Surface Area (m²/g) | CuO content (wt %) | Cu Surface Area (m²/g catalyst) | Si:Al atomic ratio | Relative Activity to Comp. Ex. 1 after 16 h | Relative Activity to Comp. Ex. 1 after 340 h |
|---|---|---|---|---|---|---|---|
| Example 1 | sol | 119.4 | 64.4 | 52.8 | 0.04 | 1.60 | 1.46 |
| Example 2 | sol | 121.3 | 66.1 | 42.7 | 0.04 | 1.61 | 1.39 |
| Example 3 | sol | 120.5 | 64.5 | 52.1 | 0.006 | 1.61 | 1.31 |
| Example 4 | sol | 120.8 | 64.2 | 54.7 | 0.08 | 1.57 | 1.38 |
| Example 5 | sol | 115.5 | 66.1 | 52.9 | 0.11 | 1.60 | 1.29 |
| Example 6 | sol | 121.6 | 62.2 | 47.6 | 0.06 | 1.50 | 1.34 |
| Example 7 | sol | 111.3 | 65.9 | 50.5 | 0.04 | 1.54 | 1.41 |
| Example 8 | sol | 114.4 | 64.6 | 39.7 | 0.04 | 1.44 | 1.47 |
| Example 9 | sol | 125.4 | 64.4 | 41.6 | 0.03 | 1.51 | 1.37 |
| Example 10 | sol | 123.7 | 63.2 | 54.9 | 0.04 | 1.64 | 1.47 |
| Example 11 | sol | 111.8 | 64.4 | 44.5 | 0.03 | 1.64 | 1.43 |
| Example 12 | sol | 127.6 | 67.8 | 49.6 | 0.04 | 1.55 | 1.32 |
| Comparative Example 1 | nitrate | 98.9 | 56.6 | 30.1 | 0.04 | 1.00 | 1.00 |
| Comparative Example 2 | nitrate | 94.7 | 56.6 | 29.5 | 0.04 | 0.74 | 0.84 |
| Comparative Example 3 | nitrate | 103.9 | 60.1 | 33.1 | 0.01 | 1.16 | 0.95 |
| Comparative Example 4 | sol | 108.7 | 64.2 | 51.7 | 0 | 1.43 | 1.09 |
| Comparative Example 5 | nitrate | 41.9 | 59.5 | 6.1 | 0.08 | 0.29 | 0.28 |
| Comparative Example 6 | nitrate | 86.8 | 42.5 | 17.7 | 0.12 | 0.73 | 0.67 |

Comparative example 4, prepared using an alumina sol in a manner consistent with Examples 1-11 but without silica, has a high initial activity but an inferior retained activity.

The aluminium nitrate-based products in Comparative Examples 1, 5 and 6 have inferior initial and retained activities. This remains so, even if the calcination conditions are adjusted in accordance with Example 1 (Comparative Example 2).

Comparative example 3, prepared by separate co-precipitation of a silica-alumina co-precipitate using aluminium nitrate, also produced a catalyst with an inferior retention of activity.

The invention claimed is:

1. A catalyst, suitable for use in carbon oxide conversion reactions, in the form of a shaped unit formed from an oxidic catalyst powder, said catalyst comprising (i) 30-70% by weight of copper oxide (CuO) based on a total weight of the catalyst, (ii) zinc oxide (ZnO), (iii) alumina and (iv) silica, wherein the catalyst has a Si: Al atomic ratio in a range 0.005:1 to 0.15:1, a BET surface area as determined by nitrogen physisorption ≥115 m²/g and a copper surface area >37 m²/g catalyst.

2. The catalyst according to claim 1 wherein the catalyst is a methanol synthesis catalyst comprising copper oxide in an amount in a range 50 to 70% by weight.

3. The catalyst according to claim 2 wherein a weight ratio CuO:ZnO is in a range of 2:1 to 3.5:1.

4. The catalyst according to claim 2 wherein the catalyst contains 20 to 30% by weight of the zinc oxide, based on a total weight of the catalyst.

5. The catalyst according to claim 1 wherein the catalyst contains 5 to 20% by weight of the alumina, based on a total weight of the catalyst.

6. The catalyst according to claim 1 wherein the catalyst has a copper surface area ≥40 m²/g.

7. The catalyst according to claim 1 wherein the catalyst further comprises one or more promoter compounds that are compounds of Mg, Co, Mn, V, Ti, Zr or rare earth metals.

8. The catalyst according to claim 1 wherein the catalyst contains 0.05 to 1.50% by weight of the silica, based on a total weight of the catalyst.

9. The catalyst according to claim 1 wherein the Si: Al atomic ratio is in a range of 0.03:1 to 0.07:1.

10. The catalyst according to claim 1 wherein a Si: Cu atomic ratio is in a range of 0.001:1 to 0.018:1.

11. The catalyst according to claim 1, wherein the BET surface area of the catalyst, as determined by nitrogen physisorption, is ≥115 m²/g up to about 140 m²/g.

12. A carbon oxides conversion process which comprises reacting a carbon oxide containing process gas containing at least one of carbon monoxide and carbon dioxide and additionally containing hydrogen and/or steam, in the presence of a catalyst according to claim 1.

13. The carbon oxides conversion process according to claim 12 wherein the process is selected from methanol synthesis and the water-gas shift reaction.

* * * * *